(12) United States Patent
Gidvani et al.

(10) Patent No.: US 10,128,999 B2
(45) Date of Patent: Nov. 13, 2018

(54) EFFICIENT PROTECTION OF BASIC SERVICE SET TRAFFIC

(71) Applicant: QUALCOMM Incorporated, San Diego, CA (US)

(72) Inventors: Ravi Gidvani, Fremont, CA (US); Srinivasa Kumar Duvvuri, San Jose, CA (US)

(73) Assignee: QUALCOMM Incorporated, San Diego, CA (US)

(*) Notice: Subject to any disclaimer, the term of this patent is extended or adjusted under 35 U.S.C. 154(b) by 106 days.

(21) Appl. No.: 14/745,343

(22) Filed: Jun. 19, 2015

(65) Prior Publication Data
US 2016/0373955 A1    Dec. 22, 2016

(51) Int. Cl.
*H04Q 7/00* (2006.01)
*H04L 5/00* (2006.01)
*H04W 74/00* (2009.01)
*H04W 28/02* (2009.01)
*H04L 12/825* (2013.01)
*H04W 74/08* (2009.01)
*H04W 84/12* (2009.01)

(52) U.S. Cl.
CPC .......... *H04L 5/0055* (2013.01); *H04L 47/266* (2013.01); *H04W 28/0205* (2013.01); *H04W 74/006* (2013.01); *H04W 74/0816* (2013.01); *H04W 84/12* (2013.01); *Y02D 70/00* (2018.01); *Y02D 70/1262* (2018.01); *Y02D 70/142* (2018.01); *Y02D 70/146* (2018.01); *Y02D 70/22* (2018.01)

(58) Field of Classification Search
CPC ............ H04W 28/0247; H04W 72/082; H04L 5/0055
USPC .................................. 370/328, 329, 330, 336
See application file for complete search history.

(56) References Cited

U.S. PATENT DOCUMENTS

| | | | |
|---|---|---|---|
| 7,710,929 B2 | 5/2010 | Moreton et al. | |
| 8,488,525 B2 | 7/2013 | Kawasaki | |
| 8,687,560 B2* | 4/2014 | Sugar .................... | H04W 4/023 370/328 |
| 9,001,796 B2* | 4/2015 | Frederiks .............. | H04W 72/10 370/336 |
| 2012/0163349 A1 | 6/2012 | Fontaine et al. | |
| 2012/0207101 A1 | 8/2012 | Chang et al. | |

(Continued)

*Primary Examiner* — Chuong T Ho
(74) *Attorney, Agent, or Firm* — Steven R. Thiel; Holland & Hart

(57) ABSTRACT

Methods, systems, and devices are described for wireless communication. An access point may use a protection mechanism to cause stations to defer from accessing the wireless medium during a quiet duration. During the quiet duration the access point may transmit data packets to stations. After the quiet duration, a contention period may be present to allow stations to monitor the medium to make sure the medium is continuously idle before attempting a transmission. The access point may determine a quiet duration based on a number of data packets pending transmission to at least one station. Furthermore, the access point may transmit data packets to a number of stations during the quiet duration. By determining the quiet duration based on a number of data packets, the access point may reduce the overall number of contention periods which may increase throughput and decrease power consumption.

32 Claims, 11 Drawing Sheets

(56) References Cited

U.S. PATENT DOCUMENTS

| | | | |
|---|---|---|---|
| 2014/0056223 A1* | 2/2014 | Quan | H04W 28/18 |
| | | | 370/328 |
| 2014/0064257 A1 | 3/2014 | Fontaine et al. | |
| 2014/0126550 A1* | 5/2014 | Frederiks | H04W 74/085 |
| | | | 370/336 |
| 2015/0249529 A1* | 9/2015 | Zheng | H04L 1/1685 |
| | | | 370/336 |
| 2016/0050659 A1* | 2/2016 | Seok | H04L 1/0003 |
| | | | 370/338 |
| 2016/0128061 A1* | 5/2016 | Coffey | H04W 74/06 |
| | | | 370/336 |

* cited by examiner

EFFICIENT PROTECTION OF BASIC SERVICE SET TRAFFIC

BACKGROUND

Field of the Disclosure

The following relates generally to wireless communication, and more specifically to efficient protection of basic service set traffic.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a wireless fidelity (Wi-Fi) (i.e., IEEE 802.11) network may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink (DL) and uplink (UL). The DL (or forward link) may refer to the communication link from the AP to the station, and the UL (or reverse link) may refer to the communication link from the station to the AP.

The AP may use protection mechanisms to protect transmissions to individual stations. The protection mechanism may protect transmissions from stations from interfering with transmissions from the AP. However, protection mechanisms may reduce efficiency or throughput of the wireless system.

SUMMARY

Systems, methods, and apparatuses for efficient protection of basic service set (BSS) traffic are described. An access point (AP) may transmit a protection message to a number of stations (STAs) using a wireless medium. The protection message may indicate a quiet duration during which the wireless medium may be busy. Then the AP may transmit a first set of data to a first STA during the quiet duration. Further, the AP may transmit a second set of data to a second STA during the same quiet duration. In some cases, the AP may determine the length of the quiet duration based on the first set of data and the second set of data. The AP may receive an acknowledgment (ACK) from the first STA indicating reception of the first set of data. The AP may transmit the second set of data to the second STA during the quiet duration based on the ACK.

A method of wireless communication is described. The method may include transmitting, from an AP to a plurality of STAs using a wireless medium, a protection message indicating a quiet duration during which the wireless medium is busy, transmitting a first set of data to a first STA of the plurality of STAs during the quiet duration, and transmitting a second set of data to a second STA of the plurality of STAs during the quiet duration.

An apparatus for wireless communication is described. The apparatus may include a medium protection manager for transmitting, from an AP to a plurality of STAs using a wireless medium, a protection message indicating a quiet duration during which the wireless medium is busy, a data manager for transmitting a first set of data to a first STA of the plurality of STAs during the quiet duration and transmitting a second set of data to a second STA of the plurality of STAs during the quiet duration.

A further apparatus for wireless communication is described. The apparatus may include a processor and memory communicatively coupled to the processor. The memory may include computer-readable code that, when executed by the processor, causes at least one device to transmit, from an AP to a plurality of STAs using a wireless medium, a protection message indicating a quiet duration during which the wireless medium is busy, transmit a first set of data to a first STA of the plurality of STAs during the quiet duration, and transmit a second set of data to a second STA of the plurality of STAs during the quiet duration.

A non-transitory computer-readable medium storing code for wireless communication is described. The code may include instructions executable to transmit, from an AP to a plurality of STAs using a wireless medium, a protection message indicating a quiet duration during which the wireless medium is busy, transmit a first set of data to a first STA of the plurality of STAs during the quiet duration, and transmit a second set of data to a second STA of the plurality of STAs during the quiet duration.

The method, apparatuses, or non-transitory computer-readable medium described herein may further include processes, features, means, or instructions for generating the first set of data and the second set of data to indicate the length of the quiet duration. Additionally or alternatively, some examples may include processes, features, means, or instructions for receiving an ACK from the first STA indicating reception of the first set of data, and transmitting the second set of data to the second STA during the quiet duration based at least in part on receiving the ACK.

The protection message may include a clear to send (CTS) to self message, and the quiet duration is indicated through a network allocation vector (NAV) of the CTS to self message. Additionally or alternatively, some examples may include processes, features, means, or instructions for transmitting the first set of data during a first portion of the quiet duration and transmitting the second set of data during a second portion of the quiet duration, wherein the second portion is mutually exclusive from the first portion.

The protection message may also include a duration between a transmission of the first set of data and a transmission of the second set of data that is shorter than a distributed coordination function (DCF) interframe space (DIFS) duration. Additionally or alternatively, some examples may include processes, features, means, or instructions for indicating the protection message and the quiet duration through a legacy signal (L-SIG) field.

The plurality of STAs may include at least a first set of STAs and a second set of STAs. Additionally or alternatively, in some examples the first set of STAs implement a first kind of physical layer of an Institute of Electrical and Electronics Engineers (IEEE) 802.11 standard and the second set of STAs implement a second kind of physical layer of an IEEE 802.11 standard, the second version being different from the first version.

The first STA and the second STA may implement a same kind of physical layer of an Institute of Electrical and Electronics Engineers (IEEE) 802.11 standard.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

The described features generally relate to improved systems, methods, and/or apparatuses for efficient protection of basic service set (BSS) traffic. Protection mechanisms may be used by wireless devices to free a wireless medium for transmissions. However, protection mechanisms may be inefficient, as they may cause wireless devices to monitor the medium for a period of time to make sure the medium is idle before transmitting. Further, complications may arise from using protection mechanisms in a BSS with a number of different wireless standards or technologies. However, a quiet duration of a protection message may be dynamically determined based on two or more pending transmissions to allow for more than one transmission during the quiet duration, when the medium is busy to stations. Further, the presence of older wireless technologies may reduce the capabilities of the entire BSS to the capabilities of the oldest, or least featured, wireless technology. By determining a quiet duration based on a number of transmissions, contention periods may be removed resulting in an increase in throughput. Further, power consumption may be reduced by allowing stations not participating in communications to remain idle for longer periods of time. Additionally, determining a quiet duration based on a number of transmissions may allow the wireless system to operate according to a more recent or feature-rich communication technology, as the older communication technologies may defer from accessing the medium during the quiet duration. Therefore, greenfield rates, or rates which lack constraints imposed by prior communication technologies, may be realized through deferring access to the medium by prior communication technologies.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
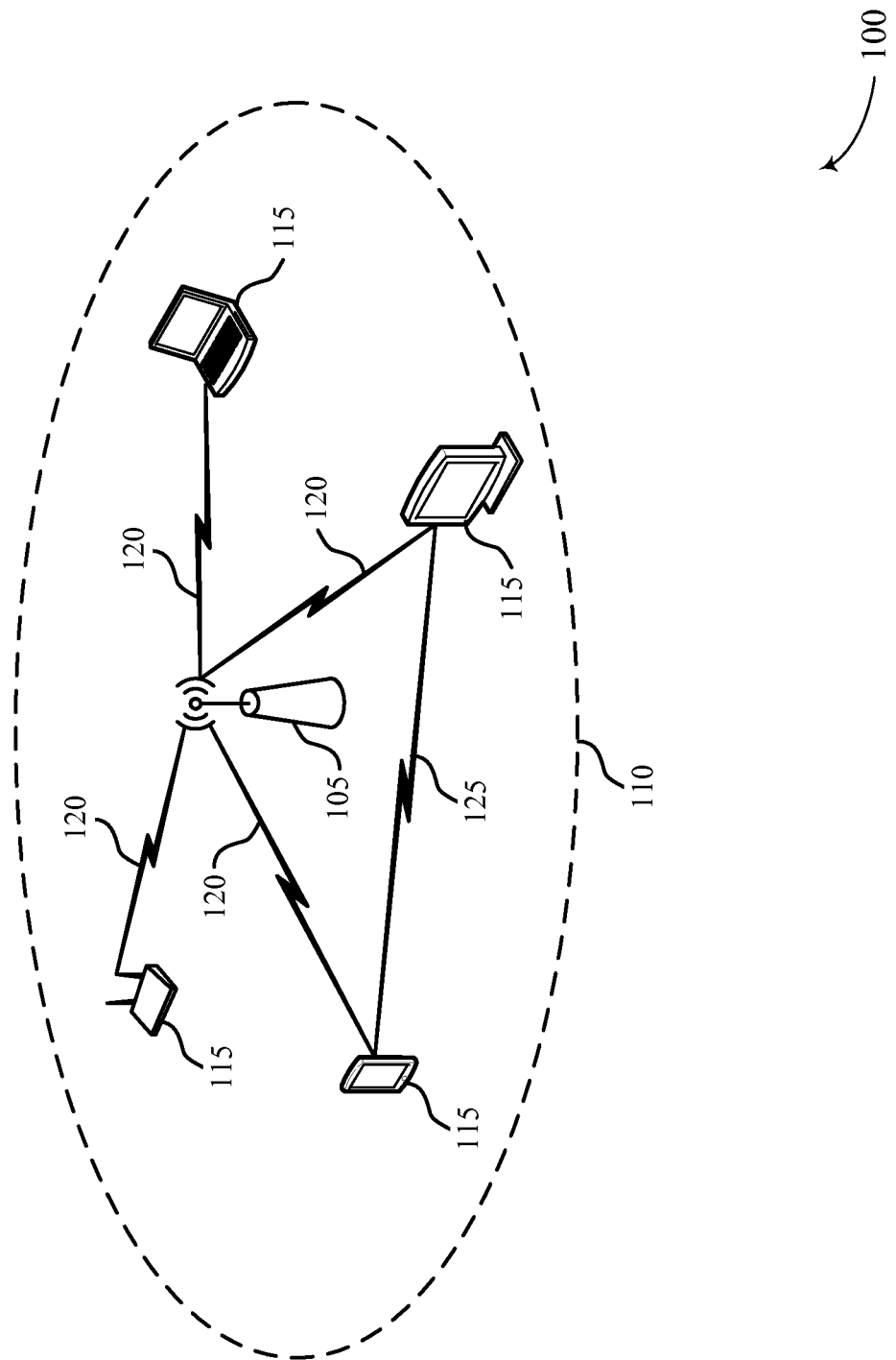
FIG. 1 illustrates a wireless local area network (WLAN) 100 (also known as a wireless fidelity (Wi-Fi) network) for efficient protection of basic service set (BSS) traffic configured in accordance with various aspects of the present disclosure.

FIG. 1 illustrates a wireless local area network (WLAN) 100 (also known as a wireless fidelity (Wi-Fi) network) configured in accordance with various aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated stations 115 may represent a BSS or an extended service set (ESS). The various STAs 115 in the network are able to communicate with one another through the AP 105. Also shown is a coverage area 110 of the AP 105, which may represent a basic service area (BSA) of the WLAN 100. An extended network station (not shown) associated with the WLAN 100 may be connected to a wired or wireless distribution system (DS) that may allow multiple access points (APs) 105 to be connected in an ESS.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A DS (not shown) may be used to connect APs 105 in an ESS. In some cases, the coverage area 110 of an AP 105 may be divided into sectors (also not shown). The WLAN network 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical (PHY) and medium access control (MAC) layers from IEEE 802.11 and versions including, but not limited to, 802.11b, 802.11g, 802.11a, 802.11n, 802.11ac, 802.11ad, 802.11ah, etc. In other implementations, peer-to-peer connections or ad hoc networks may be implemented within WLAN network 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., carrier sense multiple access with collision avoidance (CSMA/CA)) because the STAs 115 may not refrain from transmitting on top of each other. A STA 115 whose transmissions are not identifiable, but that is within the same coverage area 110 may be known as a hidden node. CSMA/CA may be supplemented by the exchange of a request to send (RTS) packet transmitted by a sending STA 115 (or AP 105) and a clear to send (CTS) packet transmitted by the receiving STA 115 (or AP 105). This may alert other devices within range of the sender and receiver not to transmit for the duration of the primary transmission. Thus, RTS/CTS may help mitigate a hidden node problem.

WLAN 100 may operate on two primary levels: the MAC of the data link layer and the PHY layer. The MAC sub-layer includes the distributed coordination function (DCF) and point coordination function (PCF). The DCF may be the basic access method, and may also be known as CSMA/CA. In DCF, each STA 115 may access the network independently using a collision avoidance protocol. For example, a STA 115 may wait for a DCF interframe space (DIFS) plus a random backoff period prior to transmitting to check whether another STA 115 is using the channel. The DCF may be implemented in all STAs 115. PCF may be implemented in selected STAs 115. In PCF, a single AP 105 coordinates the access for other STAs 115. DCF and the PCF may operate concurrently within the same BSS. For example, the two access methods may alternate, with a contention free period (CFP) for PCF followed by a contention period (CP) for DCF. A hybrid coordination function (HCF) may also be used, in which different traffic types are assigned different access priorities.

In some cases, AP 105 may communicate with STAs 115 having a number of different Institute of Electrical and Electronics Engineers (IEEE) standards. For example, the AP 105 may communicate with STAs 115 using 802.11a, 802.11b, 802.11g, 802.11n, 802.11ac, or other wireless standards. Similarly, the STAs 115 may operate using WiMax, LTE, or another communication technology. As used herein, different communication technologies may refer to different radio access technologies, different versions of a wireless standard (e.g., 802.11), different kinds of physical (PHY) layers, different format MAC headers, or different available features within the communication technology. Different communication technologies, such as different 802.11 standard versions, may have similarities and differences which may complicate systems operating using a number of communication technologies. For example, 802.11b and 802.11n may operate using the same 2.4 GHz frequency. As such, STAs 115 operating using 802.11n may be able to understand 802.11b communications, while STAs 115 operating using 802.11b may view 802.11n communications as noise. Similar communication technologies may be communication technologies which can recognize another STAs 115 transmissions, or transmissions meant for another STA 115. For example, similar communication technologies may be operate using the same frequency spectrum. In some cases, STAs 115 with different communication technologies may be STAs 115 which implement different kinds of PHY layers. Similarly, STAs 115 with different communication technologies may be STAs 115 which implement different format MAC headers. With STAs 115 of different communication technologies, the AP 105 may operate according to the oldest communication technology or the technology with the least features or abilities. Indeed, the overall features and performance of the AP 105 may be limited by the STAs 115 with which the AP 105 communicates.

Communication inefficiencies or noise caused by the AP 105 communicating with STAs 115 having different communication technologies may be reduced through the use of protection messages. Protection messages may indicate to one or more STAs 115 a quiet duration. The quiet duration may be a period of time during which the communication medium may be busy to all or some of the STAs 115, or the STAs 115 are not allowed to transmit over the medium without prompt. In some cases, a STA 115 may transmit (e.g., an ACK message) during the quiet duration, but only in response to receiving a communication from the AP 105. After receiving the ACK from the STA 115, the AP 105 may wait a DIFS duration or a contention period to find that the medium is continuously idle for the duration. Once it is determined that the medium is continuously idle, the AP 105 may transmit another protection message preparing to send another data packet to be received by a STA 115. However, it may increase efficiency if the AP 105 may transmit without waiting the DIFS duration or contention period to ensure the medium is idle.

The AP 105 may transmit a protection message which may be received by one or more STAs 115. The STAs 115 may determine a quiet duration based at least in part on the protection message. The AP 105 may transmit data which may be received by a STA 115 during the quiet duration. At times, the AP 105 may transmit data packets to a number of STAs 115 during the quiet duration. The AP 105 may determine the quiet duration based at least in part on the duration of a number of data packets. For example, the AP 105 may transmit the protection message indicating the quiet duration which may be determined as the length for transmission of two data packets to different STAs 115. Some or all of the STAs 115 receiving the protection message may remain quiet during the quiet duration. The AP 105 may transmit a first packet of data to a first STA 115 during the quiet duration. The first STA 115 may receive the data packet and may acknowledge reception of the data packet, such as through an ACK. The AP 105 may transmit a second packet of data to a second STA 115 following transmission of the first packet of data or reception of the acknowledgment. In some cases, the second STA 115 may acknowledge reception of the data packet. The quiet duration may expire after the second STA 115 receives the second packet, and the STAs 115 may return to bi-directional communications with the AP 105. In some cases, the first STA 115 and the second STA 115 may be the same communication technology and another STA 115 may be a different communication technology.

Figure 2:
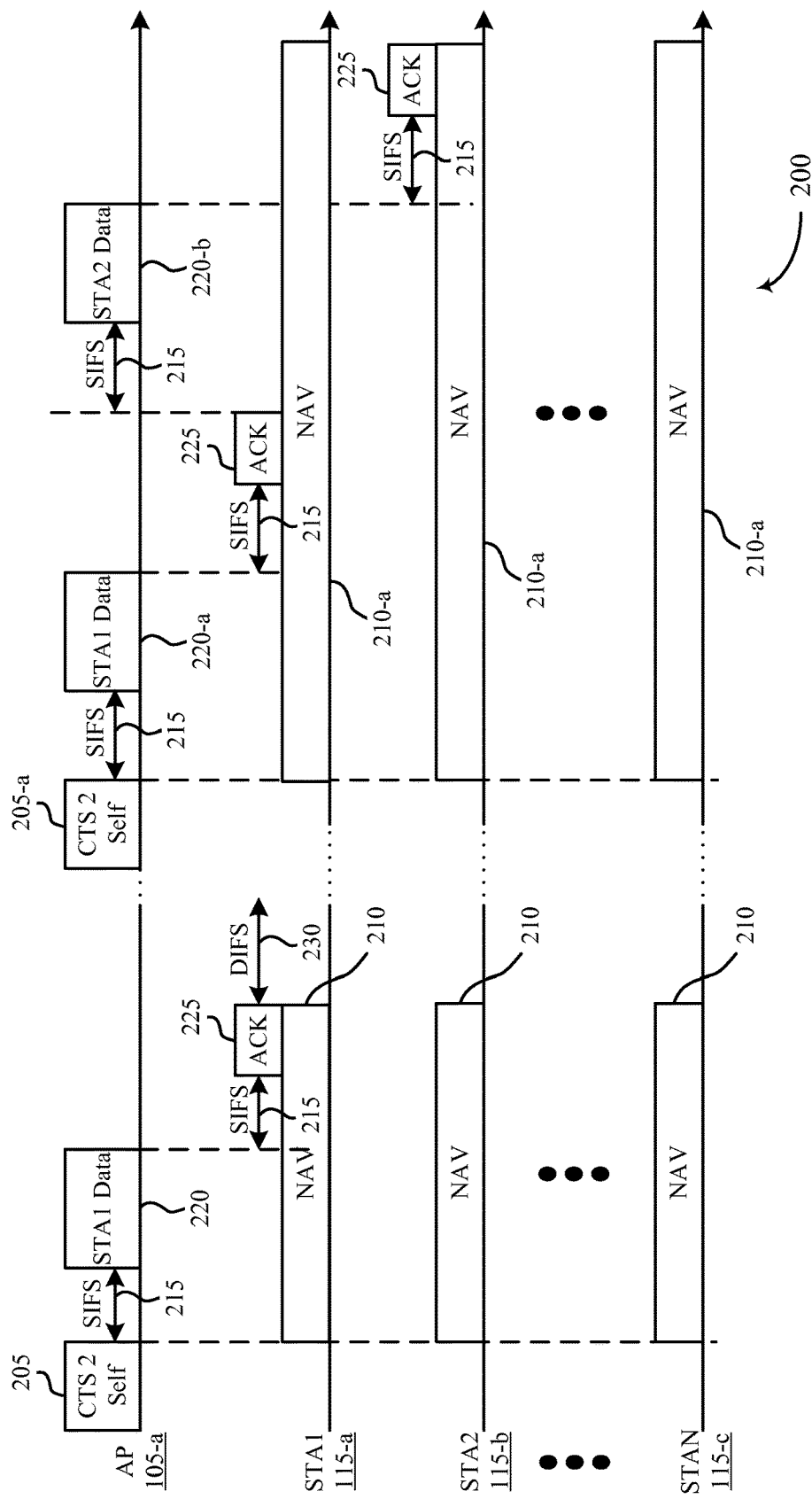
FIG. 2 illustrates an example of a wireless communications subsystem that supports efficient protection of BSS traffic in accordance with various aspects of the present disclosure.

FIG. 2 illustrates an example of a wireless communications subsystem 200 for efficient protection of BSS traffic in accordance with various aspects of the present disclosure. Wireless communications subsystem 200 may include an AP 105-$a$ and a number of STAs 115, such as STA1 115-$a$, STA2 115-$b$, and STAN 115-$c$ (where N is an integer greater than two, indicating in some embodiments that more than three STAs may connect to the AP), which may be examples of an AP 105 or STA 115 described with reference to FIG. 1.

The AP 105-$a$ may use protection mechanisms when transmitting data, such as distribution system (DS) data, to be received by different STAs 115. Protection mechanisms may allow a STA1 115-$a$ to receive data without introduction of noise from other STAs, such as STA2 115-$b$ and STAN 115-$c$. In some cases, protection mechanisms may be beneficial when a BSS includes STAs 115 with different communication technologies. For example, if a BSS includes STA1 115-$a$ which operates using the 802.11n standard and STAN 115-$c$ which operates using the 802.11b standard, STA1 115-$a$ may be able to interpret 802.11b transmissions to STAN 115-$c$, but STAN 115-$c$ may not be able to interpret or recognize 802.11n transmissions to STA1 115-$a$. As such, protection mechanisms may be used to prevent STAN 115-$c$ from attempting to communicate while the AP 105-$a$ is transmitting to STA1 115-$a$. The protection mechanism may indicate to a number of STAs 115 that the wireless medium is temporarily unavailable for transmissions from the STAs 115. As such, the protection mechanism may be any mechanism which prepares the wireless medium for transmissions from the AP 105-$a$ to STAs 115.

In some examples, the protection mechanism may be a clear to send (CTS) to self message 205. It should be noted that although the example illustrates a CTS to self message 205, another protection mechanism may be used additionally or in place of the CTS to self message 205. The CTS to self message 205 may be broadcast from the AP 105-$a$ or transmitted to certain STAs 115. In some cases, the protection mechanism may be different from a CTS to self message 205, such as request to send (RTS) and CTS frames or other protection mechanisms. The CTS to self message 205 may indicate a quiet duration to the STAs 115. The quiet duration may be a period of time during which the STAs 115 are not to transmit to the AP 105-$a$ unless in response to a transmission from the AP 105-$a$. The quiet duration may be indicated through a duration field. The duration field may be indicated in a media access control (MAC) layer frame header, a legacy signal (L-SIG) field, or any other way to indicate a quiet duration. Upon determining the duration, a STA 115 may determine a network allocation vector (NAV) 210. Determining the NAV 210 may include setting the NAV 210, updating the NAV 210, or otherwise implementing the quiet duration at the STA 115. In some cases, some or all of the STAs 115 communicating with the AP 105-$a$ may determine the NAV 210. The NAV 210 may be an indicator for a STA 115 on how long it must defer from accessing the wireless medium. The NAV 210 may be a period of time during which STAs 115 are to listen to the medium without initiating communications. The NAV 210 may be similar to a timer which starts with an initial value, or duration, and counts down at a uniform rate until reaching zero. When the counter is zero the medium may be idle, if the counter is nonzero then the medium is considered busy.

The AP 105-$a$ may wait a short interframe space (SIFS) 215 before transmitting data. The SIFS 215 may be a delay or an amount of time for processing signals. For example, if the AP 105-$a$ transmits a signal to a STA 115, the STA 115 may have an inherent amount of time, or SIFS 215, before the STA 115 has processed the signal. For example, SIFS 215 may account for propagation delays and other delays within the system, such as receiver delays, physical layer convergence protocol (PLCP) delays, MAC processing delays, or other delays. In one example, the AP may wait a SIFS 215 after the protection message before transmitting data to allow the STAs 115 to receive and interpret the protection message and set the NAV 210.

The AP 105-$a$ may transmit data 220 to be received at a STA 115, such as STA1 115-$a$. STA1 115-$a$ may receive the data during NAV 210 for STA1 115-$a$. If STA2 115-$b$ operates using the same or a similar communication technology, STA2 115-$b$ may recognize or understand the data 220, but may not attempt to interpret or decode the data 220, because the data 220 is addressed to STA1 115-$a$. As such, STA2 115-$b$ and STAN 115-$c$ may remain idle in the medium, counting down their NAV 210. STA1 115-$a$ may receive the data 220 and recognize that the data 220 is addressed to STA1 115-$a$. STA1 115-$a$ may interpret or decode the data 220. STA1 115-$a$ may transmit a message to be received at the AP 105-$a$ acknowledging receipt of the data. In some cases, the message may include an ACK 225.

A DIFS 230 or contention period may follow the ACK 225. The DIFS 230 or contention period may be a period of time during which STAs 115 or the AP 105-$a$ sense the status of the wireless medium. If the wireless medium is continuously idle for the duration of the DIFS 230 or contention period the STA 115 or AP 105-$a$ may transmit a frame. If the wireless medium is busy during the DIFS 230 or contention period, the STA 115 or AP 105-$a$ may delay or defer its transmission. The DIFS 230 or contention period may be in place to avoid collisions in a wireless system when STAs 115 and the AP 105-$a$ are not always aware when the other may transmit. In some cases, the DIFS 230 may occur following expiration of the NAV 210 of a STA 115. The DIFS 230 may not be necessary during the NAV 210, as STAs 115 may already be idle on the medium during that time due to the protection mechanism employed by the AP 105-$a$. The DIFS 230 may be inefficient as it involves a number of STAs 115 idly sensing the medium before communicating with the AP 105-$a$. As such, it would improve efficiency if multiple data transmissions from the AP 105-$a$ occur before a DIFS 230 or contention period.

The AP 105-$a$ may determine a quiet duration which is based on multiple packets of data, such as packets of data to be transmitted to a number of STAs 115. As such, the quiet duration may be an aggregated quiet duration for multiple STA 115 transmissions. For example, the AP 105-$a$ may have STA1 data 220-$a$ and STA2 data 220-$b$ to transmit. The AP 105-$a$ may determine a quiet duration based on the STA1 data 220-$a$ and the STA2 data 220-$b$, which will allow for transmission and reception of both data packets. The AP 105-$a$ may then transmit a protection message, such as CTS to self message 205-$a$, incorporating this determined duration. The STAs 115 may determine their NAV 210-$a$ based on this determined duration. The determined duration may be longer than, shorter than, or the same as the default duration for a NAV 210. The AP 105-$a$ may then wait a SIFS 215, as described above, before transmitting STA1 data 220-$a$ to be received by STA1 115-$a$. As described above, STA1 115-$a$ may receive the STA1 data 220-$a$, which may be followed by a SIFS 215 or transmission of an ACK 225 from STA1 115-*a* to AP 105-*a*. However, by determining the quiet duration based on multiple packets of data, a DIFS 230 or contention period may be avoided.

The AP 105-*a* may receive the ACK 225 transmitted from STA1 115-*a*. In some cases, the AP 105-*a* may interpret or decode the ACK 225 after a SIFS 215. The AP 105-*a* may transmit STA2 data 220-*b* which may be received by STA2 115-*b*. In some cases, the AP 105-*a* may transmit STA2 data 220-*b* after transmitting STA1 data 220-*a*. At times, the AP 105-*a* may transmit STA2 data 220-*b* based at least in part on reception of the ACK 225 from STA1 115-*a* or another trigger. As described above, STA2 115-*b* may receive the STA2 data 220-*b*, which may be followed by a SIFS 215 or transmission of an ACK 225 from STA2 115-*b* to AP 105-*a*. STAN 115-*c* may remain in the determined quiet duration, or NAV 210-*a*, throughout the transmission from the AP 105-*a* of STA1 data 220-*a* and STA2 data 220-*b* to STA1 115-*a* and STA2 115-*b* respectively. It should be noted that although, as illustrated, two data packets are used to determine the quiet duration and are transmitted during the quiet duration, any number greater than two data packets may be used to determine the quiet duration or may be transmitted during the quiet duration.

In some cases, STA1 115-*a* and STA2 115-*b* may be STAs 115 with the same, or similar, communication technologies, or may be STAs 115 which may detect transmissions to the other STA 115. STAN 115-*c* may be a different communication technology than at least one of STA1 115-*a* and STA2 115-*b*. In some cases, STAN 115-*c* may be a plurality of STAs 115 which may be the same or different communication technologies.

Figure 3:
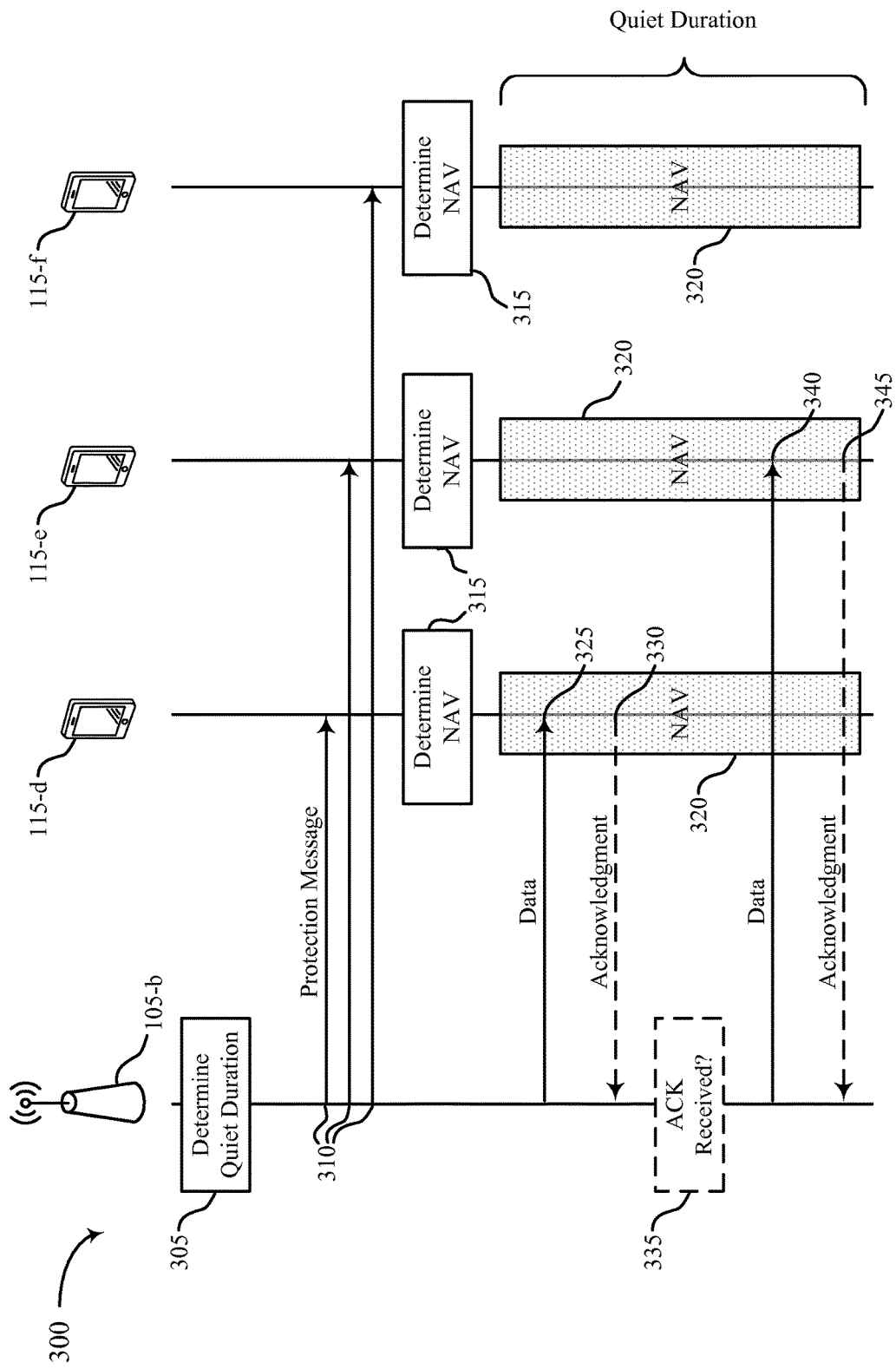
FIG. 3 illustrates an example of a process flow that supports efficient protection of BSS traffic in accordance with various aspects of the present disclosure.

FIG. 3 illustrates an example of a process flow 300 for efficient protection of BSS traffic in accordance with various aspects of the present disclosure. Process flow 300 may include an AP 105-*b* and STAs 115-*d*, 115-*e*, and 115-*f*, which may be examples of an AP 105 and a STA 115 described with reference to FIGS. 1-2.

At block 305, the AP 105-*b* may generate a first set of data and a second set of data to indicate a length of the quiet duration. The AP 105-*b* may determine a quiet duration, such as based on two or more packets of data.

At block 310, the AP 105-*b* may transmit, to a plurality of STAs using a wireless medium, a protection message indicating a quiet duration during which the wireless medium may be busy. At least one STA may receive the protection message. In some examples, the protection message comprises a CTS to self message, and the quiet duration is indicated through a NAV of the CTS to self message. The AP 105-*b* may indicate the protection message and the quiet duration through a legacy signal (L-SIG) field. In some examples the plurality of STAs comprises at least a first set of STAs and a second set of STAs. In some examples the first set of STAs implement a first kind of physical layer of an IEEE 802.11 standard and the second set of STAs implement a second kind of physical layer of an IEEE 802.11 standard, the second version being different from the first version. In some examples the first STA and the second STA implement a same kind of physical layer of an IEEE 802.11 standard.

At block 315, at least one STA 115 may determine a NAV. Determining the NAV may be based at least in part on the protection message or the quiet duration. At block 320, at least one STA 115 may start the NAV for STAs 115. A NAV may be started at the beginning of the quiet duration. At block 325, the AP 105-*b* may transmit a first set of data to a first STA 115-*d* of the set of STAs during the quiet duration. The first STA 115-*d* may receive the first set of data from the AP 105-*b*. At block 330, the AP 105-*b* may receive an ACK from the first STA 115-*d* indicating reception of the first set of data. The first STA 115-*d* may transmit an ACK to the AP 105-*b*. At block 335, the AP 105-*b* may determine whether the AP 105-*b* has received the ACK from the first STA 115-*d*.

At block 340, the AP 105-*b* may transmit a second set of data to a second STA 115-*e* of the set of STAs during the quiet duration, which in some embodiments may be based at least in part on the ACK. The AP 105-*b* may transmit the first set of data during a first time period and the second set of data during a second time period, wherein the second time period is different from the first time period. In some examples, a duration between a transmission of the first set of data and a transmission of the second set of data is shorter than a DIFS duration. At block 345, the AP 105-*b* may receive an ACK from the second STA 115-*e* indicating reception of the second set of data. The second STA 115-*e* may transmit an ACK to the AP 105-*b*.

Figure 4:
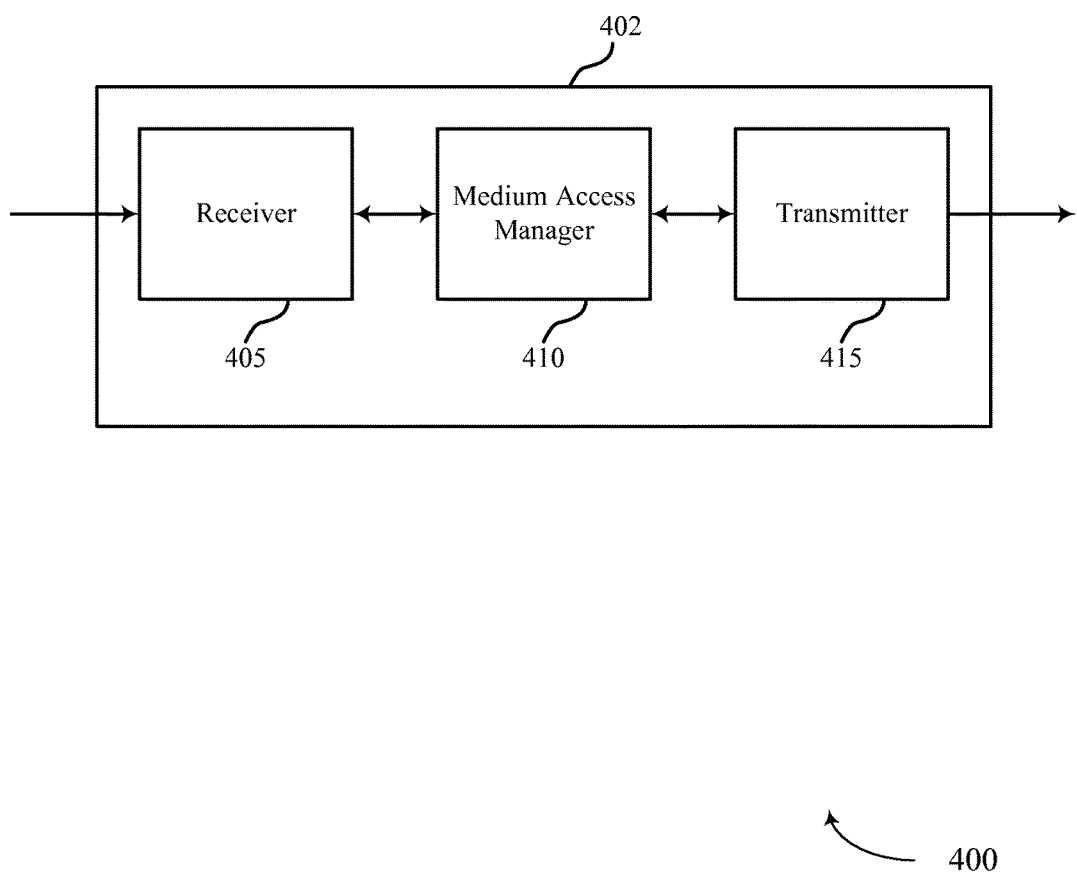
FIG. 4 shows a block diagram of a wireless device that supports efficient protection of BSS traffic in accordance with various aspects of the present disclosure.

FIG. 4 shows a block diagram 400 of a wireless device 402 configured for efficient protection of BSS traffic in accordance with various aspects of the present disclosure. The wireless device 402 may be an example of aspects of an AP 105 described with reference to FIGS. 1-3. Wireless device 402 may include a receiver 405, a medium access manager 410, or a transmitter 415. Wireless device 402 may also include a processor. Each of these components may be in communication with each other.

The receiver 405 may receive information such as packets, user data, or control information associated with various information channels (e.g., control channels, data channels, and information related to efficient protection of BSS traffic, etc.). Information may be passed on to the medium access manager 410, and to other components of wireless device 402.

The medium access manager 410 may transmit, from an access point (AP) to a plurality of STAs using a wireless medium, a protection message indicating a quiet duration during which the wireless medium is busy, transmit a first set of data to a first STA of the plurality of STAs during the quiet duration, and transmit a second set of data to a second STA of the plurality of STAs during the quiet duration.

The transmitter 415 may transmit signals received from other components of wireless device 402. In some examples, the transmitter 415 may be collocated with the receiver 405 in a transceiver module. The transmitter 415 may include a single antenna, or it may include a plurality of antennas.

Figure 5:
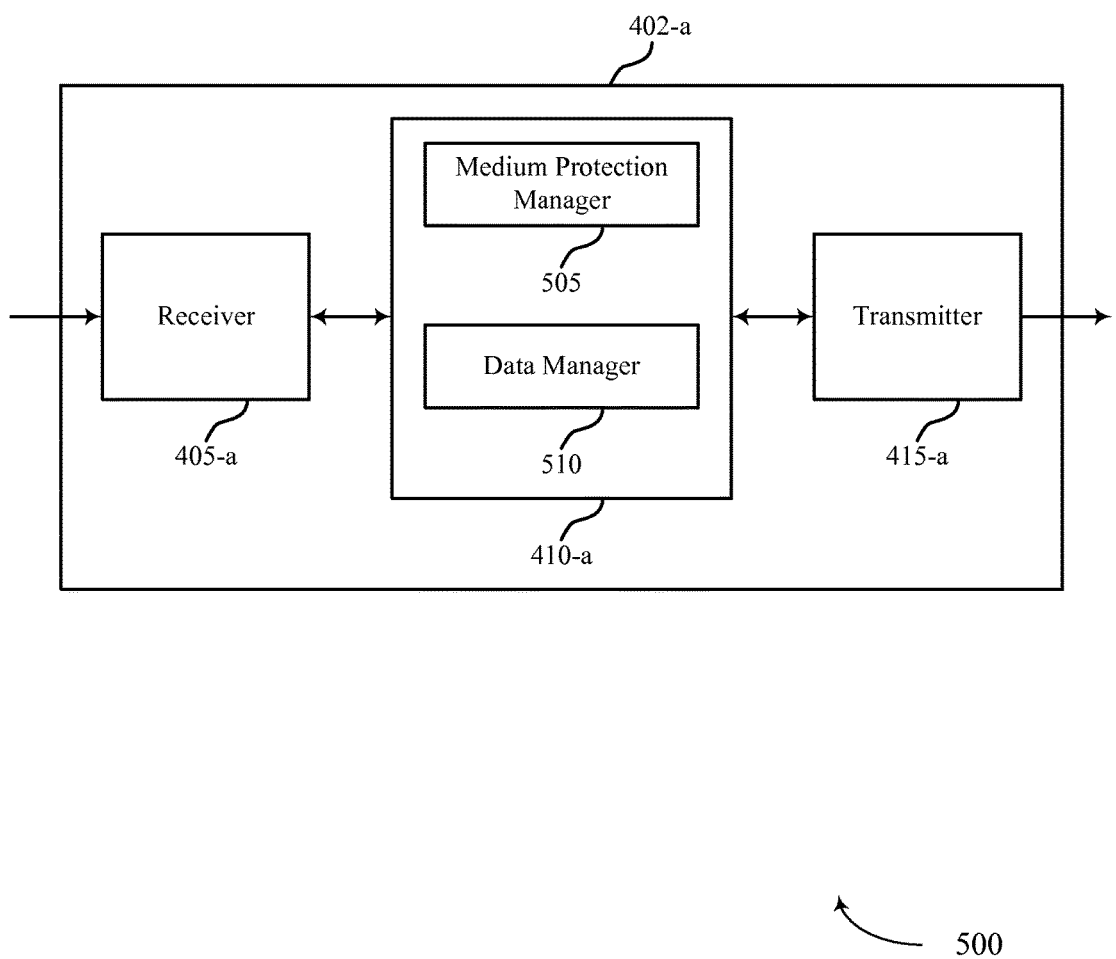
FIG. 5 shows a block diagram of a wireless device that supports efficient protection of BSS traffic in accordance with various aspects of the present disclosure.

FIG. 5 shows a block diagram 500 of a wireless device 402-*a* for efficient protection of BSS traffic in accordance with various aspects of the present disclosure. The wireless device 402-*a* may be an example of aspects of the wireless device 402 described with reference to FIG. 4. The wireless device 402-*a* may be an example of aspects of an AP 105 described with reference to FIGS. 1-4. Wireless device 402-*a* may include a receiver 405-*a*, a medium access manager 410-*a*, or a transmitter 415-*a*. Wireless device 402-*a* may also include a processor. Each of these components may be in communication with each other. The medium access manager 410-*a* may also include a medium protection manager 505, and a data manager 510.

The receiver 405-*a* may receive information which may be passed on to medium access manager 410-*a*, and to other components of wireless device 402-*a*. The medium access manager 410-*a* may perform the operations described with reference to FIG. 4. The transmitter 415-*a* may transmit signals received from other components of wireless device 402-*a*.

The medium protection manager 505 may transmit, from an access point (AP) to a plurality of STAs using a wireless medium, a protection message indicating a quiet duration during which the wireless medium is busy as described with reference to FIGS. 2-3. In some examples, the protection message comprises a CTS to self message, and the quiet duration may be indicated through a NAV of the CTS to self message. The medium protection manager 505 may also indicate the protection message and the quiet duration through a L-SIG field. In some examples, the plurality of STAs comprises at least a first set of STAs and a second set of STAs. In some examples, the first set of STAs implement a first kind of physical layer of an IEEE 802.11 standard and the second set of STAs implement a second kind of physical layer of an IEEE 802.11 standard, the second version being different from the first version. In some examples, the first STA and the second STA implement a same kind of physical layer of an IEEE 802.11 standard.

The data manager 510 may transmit a first set of data to a first STA of the plurality of STAs during the quiet duration as described with reference to FIGS. 2-3. The data manager 510 may also transmit a second set of data to a second STA of the plurality of STAs during the quiet duration. The data manager 510 may also transmit the second set of data to the second STA during the quiet duration based at least in part on the ACK. The data manager 510 may also transmit the first set of data during a first time period and the second set of data during a second time period, wherein the second time period is different from the first time period.

Figure 6:
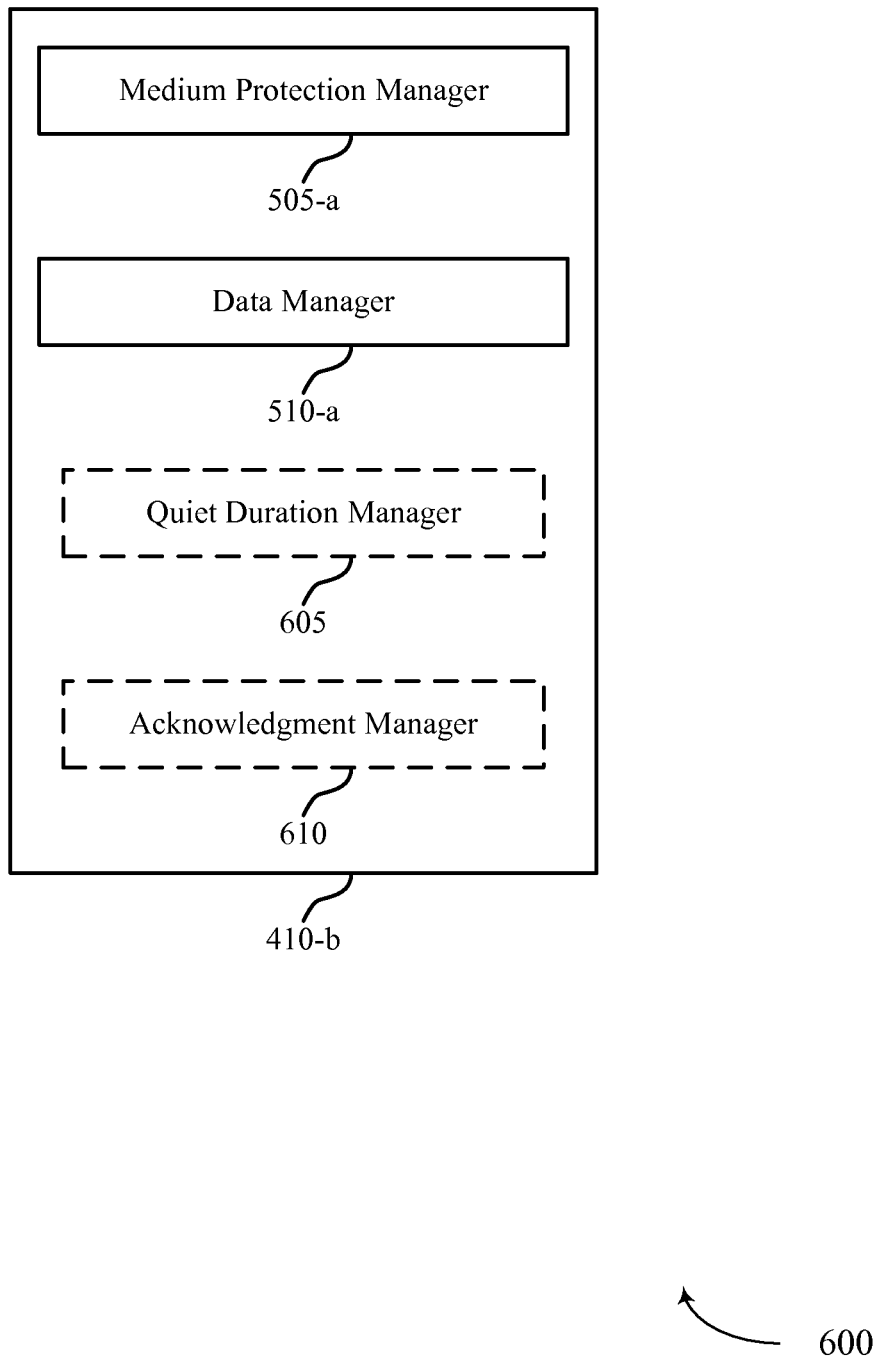
FIG. 6 shows a block diagram of a wireless device that supports efficient protection of BSS traffic in accordance with various aspects of the present disclosure.

FIG. 6 shows a block diagram 600 of a medium access manager 410-b, which may be an alternative embodiment of medium access manager 410-a of FIG. 5. Alternative or additional to FIG. 5, the medium access manager 410-b may include a quiet duration manager 605, and an acknowledgment manager 610.

The quiet duration manager 605 may generate the first set of data and the second set of data to indicate the length of the quiet duration as described with reference to FIGS. 2-3. In some examples, a duration between a transmission of the first set of data and a transmission of the second set of data may be shorter than a DIFS duration.

The acknowledgment manager 610 may receive an ACK from the first STA 115 indicating reception of the first set of data as described with reference to FIGS. 2-3. The acknowledgment manager 610 may further determine whether an ACK has been received, such as in response to a transmission. In some cases, if it is determined that an ACK has been received, the medium access manager 410-b may prepare a next transmission.

Figure 7A:
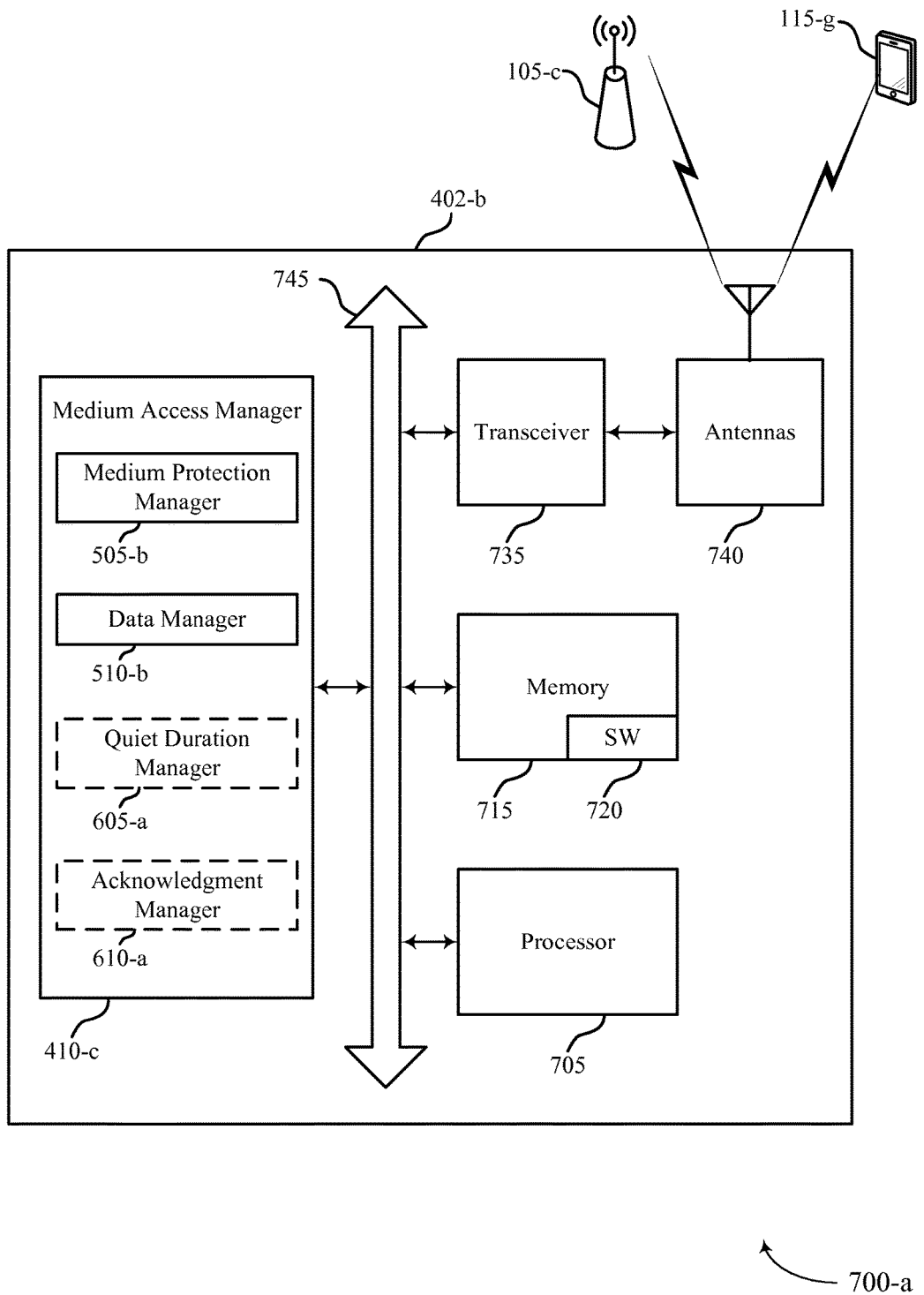
FIG. 7A illustrates a block diagram of a system including a wireless device that supports efficient protection of BSS traffic in accordance with various aspects of the present disclosure.

FIG. 7A shows a diagram of a system 700-a including a wireless device 402-b, which may be an example of a wireless device 402, a wireless device 402-a, or an AP 105 described with reference to FIGS. 1-6. The wireless device 402-b may include a medium access manager 410-c, which may be an example of the medium access manager 410, 410-a, or 410-b, described with reference to FIGS. 4-6. The wireless device 402-b may also include components for bi-directional voice and data communications including components for transmitting communications and components for receiving communications (e.g., transceiver 735 and antenna(s) 740). For example, wireless device 402-b may communicate bi-directionally with AP 105-c or STA 115-g. The transceiver 735 may communicate bi-directionally, via the antenna(s) 740 or wired or wireless links, with one or more networks, as described above. For example, the transceiver 735 may communicate bi-directionally with a STA 115 or another AP 105. The transceiver 735 may include a modem to modulate the packets and provide the modulated packets to the antenna(s) 740 for transmission, and to demodulate packets received from the antenna(s) 740. While the wireless device 402-b may include a single antenna 740, the wireless device 402-b may also have multiple antennas 740 capable of concurrently transmitting or receiving multiple wireless transmissions.

The wireless device 402-b may also include a processor 705 and memory 715 (including software (SW)) 720. The memory 715 may include random access memory (RAM) and read only memory (ROM). The memory 715 may store computer-readable, computer-executable software/firmware code 720 including instructions that, when executed, cause the processor 705 to perform various functions described herein (e.g., efficient protection of BSS traffic, etc.). Alternatively, the computer-executable software/firmware code 720 may not be directly executable by the processor 705 but cause a computer (e.g., when compiled and executed) to perform functions described herein. The processor 705 may include an intelligent hardware device, (e.g., a central processing unit (CPU), a microcontroller, an application specific integrated circuit (ASIC), etc.).

The medium protection manager 505-b and data manager 510-b may perform the functions described above with reference to FIG. 5. The medium access manager 410-c may further include a quiet duration manager 605-a and an acknowledgment manager 610-a which may perform the functions described above with reference to FIG. 6.

Figure 7B:
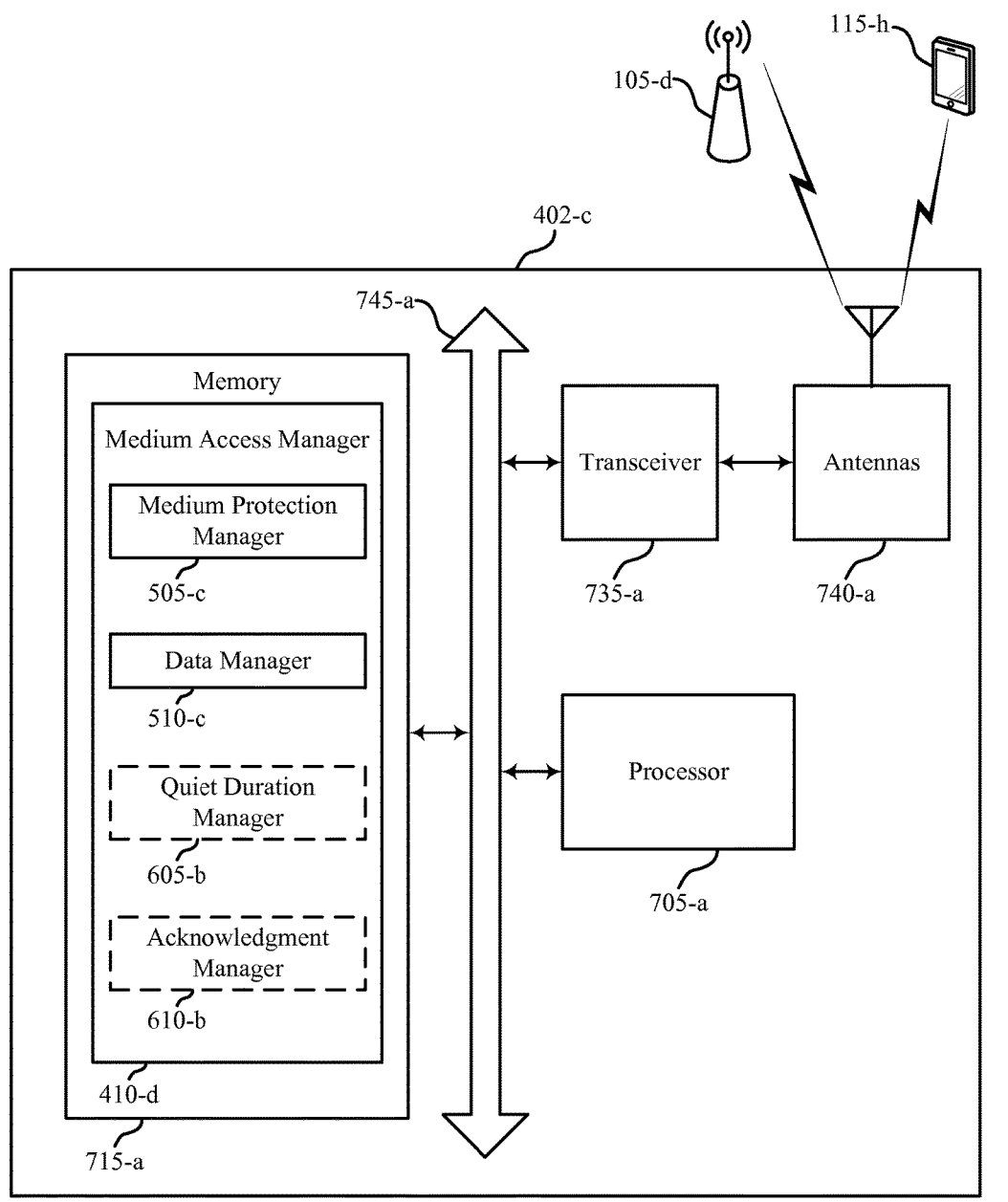
FIG. 7B illustrates a block diagram of a system including a wireless device that supports efficient protection of BSS traffic in accordance with various aspects of the present disclosure.

FIG. 7B shows a diagram of a system 700-b, similar to the wireless device 402-b of FIG. 7A, except that the medium access manager 410-c may be embodied in instructions stored on memory 715-a, which the instructions may be executed by the processor 705-a to cause the device to perform access manager functions.

The components of wireless device 402, wireless device 402-a, wireless device 402-b, wireless device 402-c, medium access manager 410-c, and medium access manager 410-d may, individually or collectively, be implemented with at least one ASIC adapted to perform some or all of the applicable functions in hardware. Alternatively, the functions of these components may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 8:
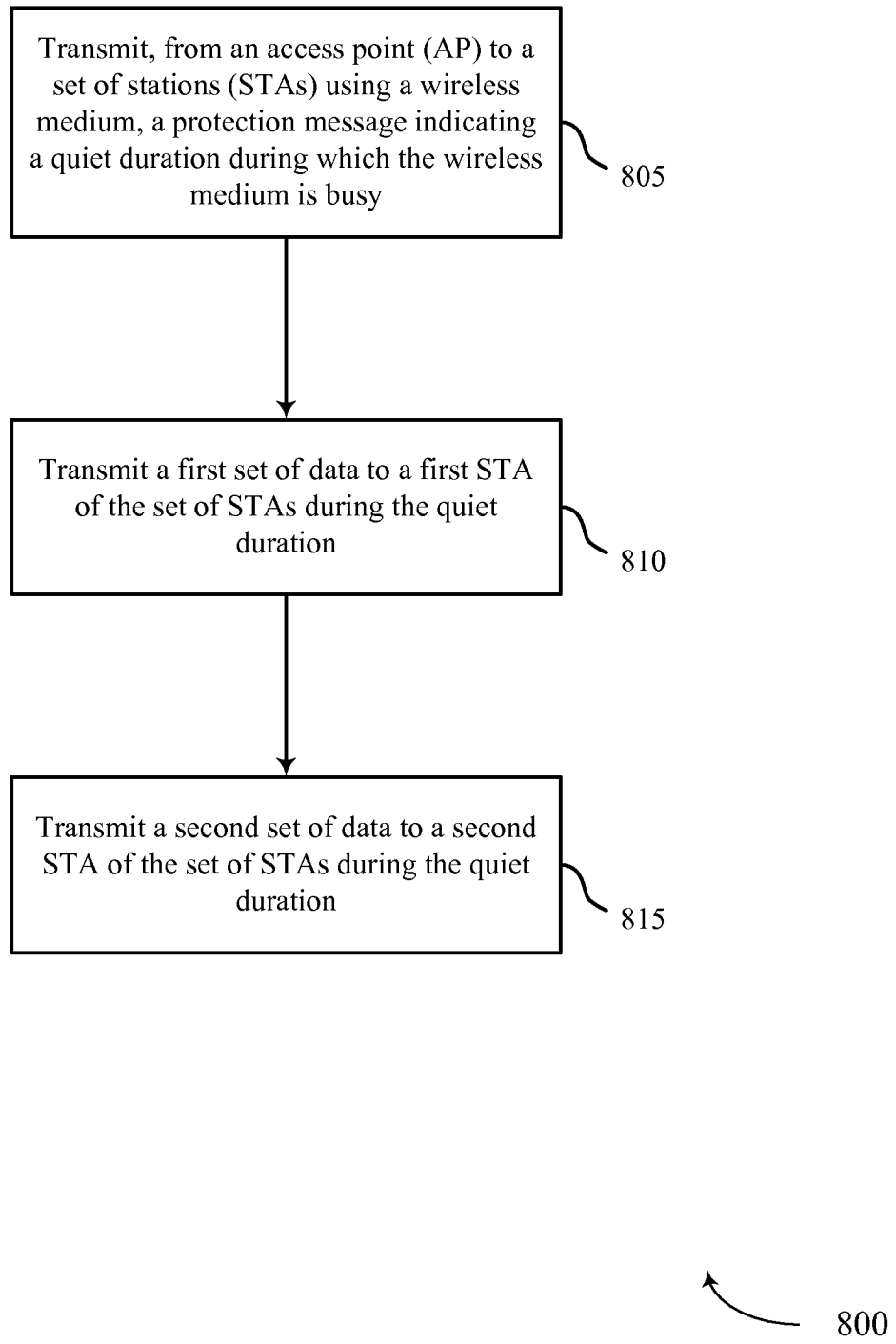
FIG. 8 illustrates a method for efficient protection of BSS traffic in accordance with various aspects of the present disclosure.

FIG. 8 shows a flowchart illustrating a method 800 for efficient protection of BSS traffic in accordance with various aspects of the present disclosure. The operations of method 800 may be implemented by a wireless device 402, an AP 105, or its components as described with reference to FIGS. 1-7B. For example, the operations of method 800 may be performed by the medium access manager 410 as described with reference to FIGS. 4-7B. In some examples, an AP 105 or wireless device 402 may execute a set of codes to control the functional elements of the AP 105 or wireless device 402 to perform the functions described below. Additionally or alternatively, the AP 105 or wireless device 402 may perform aspects of the functions described below using special-purpose hardware.

At block 805, the wireless device 402 may transmit, from an AP to a plurality of STAs using a wireless medium, a protection message indicating a quiet duration during which the wireless medium is busy as described with reference to FIGS. 2-3. At block 810, the wireless device 402 may transmit a first set of data to a first STA of the plurality of STAs during the quiet duration as described with reference to FIGS. 2-3. At block 815, the wireless device 402 may transmit a second set of data to a second STA of the plurality of STAs during the quiet duration as described with reference to FIGS. 2-3.

Figure 9:
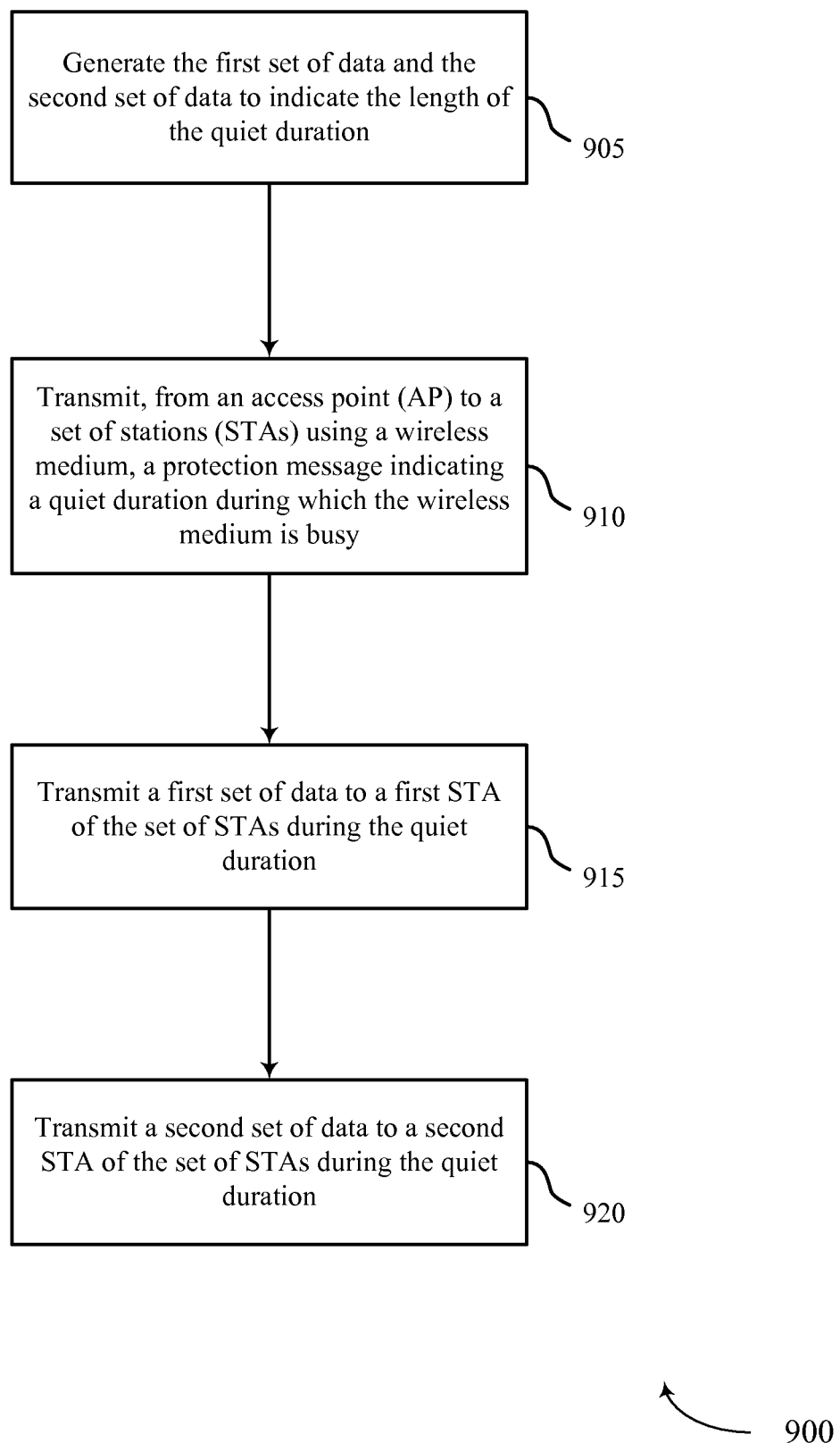
FIG. 9 illustrates a method for efficient protection of BSS traffic in accordance with various aspects of the present disclosure.

FIG. 9 shows a flowchart illustrating a method 900 for efficient protection of BSS traffic in accordance with various aspects of the present disclosure. The operations of method 900 may be implemented by a wireless device 402, an AP 105, or its components as described with reference to FIGS. 1-7B. For example, the operations of method 900 may be performed by the medium access manager 410 as described with reference to FIGS. 4-7B. In some examples, an AP 105 or wireless device 402 may execute a set of codes to control the functional elements of the AP 105 or wireless device 402 to perform the functions described below. Additionally or alternatively, the AP 105 or wireless device 402 may perform aspects of the functions described below using special-purpose hardware. The method 900 may also incorporate aspects of method 800 of FIG. 8.

At block 905, the wireless device 402 may generate a first set of data and a second set of data to indicate a length of the quiet duration as described with reference to FIGS. 2-3. At block 910, the wireless device 402 may transmit, from an AP to a plurality of STAs using a wireless medium, a protection message indicating a quiet duration during which the wireless medium is busy as described with reference to FIGS. 2-3. At block 915, the wireless device 402 may transmit a first set of data to a first STA of the plurality of STAs during the quiet duration as described with reference to FIGS. 2-3. At block 920, the wireless device 402 may transmit a second set of data to a second STA of the plurality of STAs during the quiet duration as described with reference to FIGS. 2-3.

Figure 10:
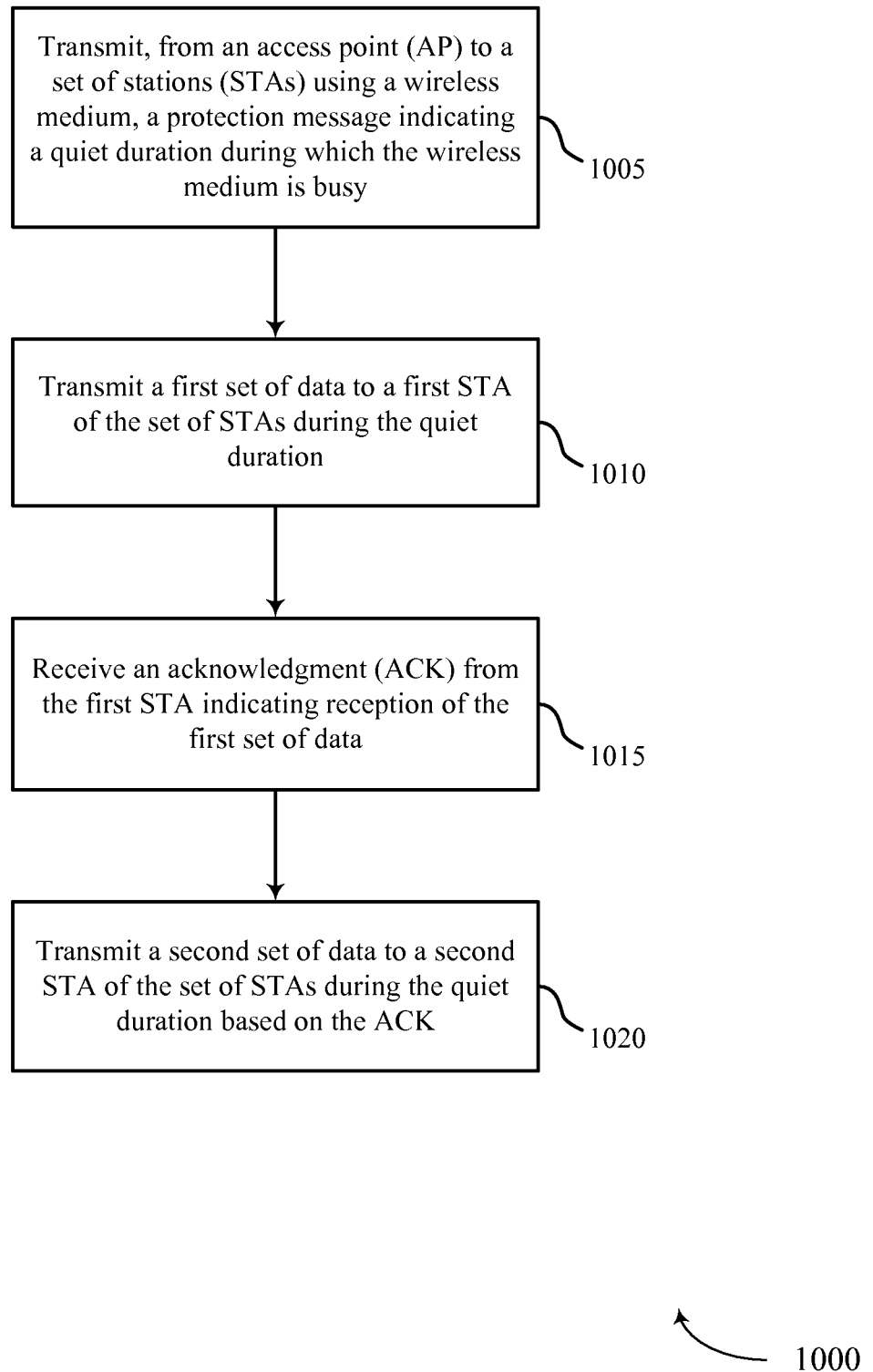
FIG. 10 illustrates a method for efficient protection of BSS traffic in accordance with various aspects of the present disclosure.

FIG. 10 shows a flowchart illustrating a method 1000 for efficient protection of BSS traffic in accordance with various aspects of the present disclosure. The operations of method 1000 may be implemented by a wireless device 402, an AP 105, or its components as described with reference to FIGS. 1-7B. For example, the operations of method 1000 may be performed by the medium access manager 410 as described with reference to FIGS. 4-7B. In some examples, an AP 105 or wireless device 402 may execute a set of codes to control the functional elements of the AP 105 or wireless device 402 to perform the functions described below. Additionally or alternatively, the AP 105 or wireless device 402 may perform aspects of the functions described below using special-purpose hardware. The method 1000 may also incorporate aspects of methods 800 and 900 of FIGS. 8-9.

At block 1005, the wireless device 402 may transmit, from an AP to a plurality of STAs using a wireless medium, a protection message indicating a quiet duration during which the wireless medium is busy as described with reference to FIGS. 2-3. At block 1010, the wireless device 402 may transmit a first set of data to a first STA of the plurality of STAs during the quiet duration as described with reference to FIGS. 2-3. At block 1015, the wireless device 402 may receive an ACK from the first STA indicating reception of the first set of data as described with reference to FIGS. 2-3. At block 1020, the wireless device 402 may transmit a second set of data to a second STA of the plurality of STAs during the quiet duration based at least in part on the ACK as described with reference to FIGS. 2-3.

It should be noted that methods 800, 900, and 1000 describe possible implementations. The operations or blocks may be rearranged or otherwise modified such that other implementations are possible. In some examples, aspects from two or more of the methods 800, 900, and 1000 may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
   transmitting, from an access point (AP) to a plurality of stations (STAs) using a wireless medium, a protection message indicating a quiet duration during which the wireless medium is busy;
   transmitting a first set of data to a first STA of the plurality of STAs during the quiet duration; and
   transmitting a second set of data to a second STA of the plurality of STAs during the quiet duration, wherein a duration of each of one or more interframe spaces between transmission of the first set of data and transmission of the second set of data is shorter than a distributed coordination function (DCF) interframe space (DIFS) duration.

2. The method of claim 1, further comprising:
   transmitting the first set of data during a first portion of the quiet duration; and
   transmitting the second set of data during a second portion of the quiet duration,
   wherein the second portion is mutually exclusive from the first portion.

3. The method of claim 1, wherein the duration of each of the one or more interframe spaces between transmission of the first set of data and transmission of the second set of data comprises a short interframe space (SIFS) duration.

4. The method of claim 1, further comprising:
   determining a length of the quiet duration to comprise at least a sum of a length of transmission of the first set of data and a length of transmission of the second set of data.

5. The method of claim 1, wherein the protection message comprises a clear to send (CTS) to self message, and the quiet duration is indicated through a network allocation vector (NAV) of the CTS to self message.

6. The method of claim 1, further comprising:
   receiving an acknowledgment (ACK) from the first STA indicating reception of the first set of data; and
   transmitting the second set of data to the second STA during the quiet duration based at least in part on receiving the ACK.

7. The method of claim 6, wherein:
   a first duration between transmission of the first set of data and reception of the ACK is shorter than the DIFS duration; and
   a second duration between the ACK and transmission of the second set of data is shorter than the DIFS duration.

8. The method of claim 1, further comprising:
   indicating the protection message and the quiet duration through a legacy signal (L-SIG) field.

9. The method of claim 1, wherein the plurality of STAs comprises at least a first set of STAs including at least the first STA and a second set of STAs including at least the second STA.

10. The method of claim 9, wherein the first set of STAs use a first communication technology and the second set of STAs use a second communication technology different from the first communication technology.

11. The method of claim 10, wherein:
   the first communication technology implements one of an Institute of Electrical and Electronics Engineers (IEEE) 802.11a, 802.11b, 802.11g, 802.11n, 802.11ac, 802.11ad, or 802.11ah standard; and
   the second communication technology implements a different one of the IEEE 802.11a, 802.11b, 802.11g, 802.11n, 802.11ac, 802.11ad, or 802.11ah standard.

12. The method of claim 10, wherein the first communication technology implements a first radio access technology (RAT) and the second communication technology implements a second RAT different from the first RAT.

13. The method of claim 1, wherein the AP avoids a contention period between the transmission of the first set of data and the transmission of the second set of data.

14. An apparatus for wireless communication, comprising:
   a medium protection manager to transmit, from an access point (AP) to a plurality of stations (STAs) using a wireless medium, a protection message indicating a quiet duration during which the wireless medium is busy; and
   a data manager to transmit a first set of data to a first STA of the plurality of STAs during the quiet duration and to transmit a second set of data to a second STA of the plurality of STAs during the quiet duration, wherein a duration of each of one or more interframe spaces between transmission of the first set of data and transmission of the second set of data is shorter than a distributed coordination function (DCF) interframe space (DIFS) duration.

15. The apparatus of claim 14, wherein the data manager:
   transmits the first set of data during a first portion of the quiet duration; and
   transmits the second set of data during a second portion of the quiet duration,
   wherein the second portion is mutually exclusive from the first portion.

16. The apparatus of claim 14, wherein the duration of each of the one or more interframe spaces between transmission of the first set of data and transmission of the second set of data comprises a short interframe space (DIFS) (SIFS) duration.

17. The apparatus of claim 14, further comprising:
a quiet duration manager to determine a length of the quiet duration to comprise at least a sum of a length of transmission of the first set of data and a length of transmission of the second set of data.

18. The apparatus of claim 14, wherein the protection message comprises a clear to send (CTS) to self message, and the quiet duration is indicated through a network allocation vector (NAV) of the CTS to self message.

19. The apparatus of claim 14, further comprising:
an acknowledgment manager to receive an acknowledgment (ACK) from the first STA indicating reception of the first set of data; and
wherein the data manager transmits the second set of data to the second STA during the quiet duration based at least in part on receiving the ACK.

20. The apparatus of claim 14, wherein the medium protection manager indicates the protection message and the quiet duration through a legacy signal (L-SIG) field.

21. The apparatus of claim 14, wherein the plurality of STAs comprises at least a first set of STAs including at least the first STA and a second set of STAs including at least the second STA.

22. The apparatus of claim 21, wherein the first set of STAs use a first communication technology and the second set of STAs use a second communication technology different from the first communication technology.

23. An apparatus for wireless communication, comprising:
a processor and memory communicatively coupled to the processor, the memory comprising computer-readable code that, when executed by the processor, causes at least one device to:
transmit, from an access point (AP) to a plurality of stations (STAs) using a wireless medium, a protection message indicating a quiet duration during which the wireless medium is busy;
transmit a first set of data to a first STA of the plurality of STAs during the quiet duration; and
transmit a second set of data to a second STA of the plurality of STAs during the quiet duration, wherein a duration of each of one or more interframe spaces between transmission of the first set of data and transmission of the second set of data is shorter than a distributed coordination function (DCF) interframe space (DIFS) duration.

24. The apparatus of claim 23, wherein the computer-readable code, when executed by the processor, causes the at least one device to:
transmit the first set of data during a first portion of the quiet duration; and
transmit the second set of data during a second portion of the quiet duration,
wherein the second portion is mutually exclusive from the first portion.

25. The apparatus of claim 23, wherein the computer-readable code, when executed by the processor, causes the at least one device to:
determine a length of the quiet duration to comprise at least a sum of a length of transmission of the first set of data and a length of transmission of the second set of data.

26. The apparatus of claim 23, wherein the computer-readable code, when executed by the processor, causes the at least one device to:
receive an acknowledgment (ACK) from the first STA indicating reception of the first set of data; and
transmit the second set of data to the second STA during the quiet duration based at least in part on receiving the ACK.

27. The apparatus of claim 23, wherein the computer-readable code, when executed by the processor, causes the at least one device to:
indicate the protection message and the quiet duration through a legacy signal (L-SIG) field.

28. A non-transitory computer-readable medium storing code for wireless communication, the code comprising instructions executable to:
transmit, from an access point (AP) to a plurality of stations (STAs) using a wireless medium, a protection message indicating a quiet duration during which the wireless medium is busy;
transmit a first set of data to a first STA of the plurality of STAs during the quiet duration; and
transmit a second set of data to a second STA of the plurality of STAs during the quiet duration, wherein a duration of each of one or more interframe spaces between transmission of the first set of data and transmission of the second set of data is shorter than a distributed coordination function (DCF) interframe space (DIFS) duration.

29. The non-transitory computer-readable medium of claim 28, wherein the instructions are executable to:
transmit the first set of data during a first portion of the quiet duration; and
transmit the second set of data during a second portion of the quiet duration,
wherein the second portion is mutually exclusive from the first portion.

30. The non-transitory computer-readable medium of claim 28, wherein the instructions are executable to:
determine a length of the quiet duration to comprise at least a sum of a length of transmission of the first set of data and a length of transmission of the second set of data.

31. The non-transitory computer-readable medium of claim 28, wherein the instructions are executable to:
receive an acknowledgment (ACK) from the first STA indicating reception of the first set of data; and
transmit the second set of data to the second STA during the quiet duration based at least in part on receiving the ACK.

32. The non-transitory computer-readable medium of claim 28, wherein the instructions are executable to:
indicate the protection message and the quiet duration through a legacy signal (L-SIG) field.

* * * * *